US007127127B2

(12) United States Patent
Jojic et al.

(10) Patent No.: US 7,127,127 B2
(45) Date of Patent: Oct. 24, 2006

(54) SYSTEM AND METHOD FOR ADAPTIVE VIDEO FAST FORWARD USING SCENE GENERATIVE MODELS

(75) Inventors: Nebojsa Jojic, Redmond, WA (US); Nemanja Petrovic, Urbana, IL (US)

(73) Assignee: Microsoft Corporation, Redmond, WA (US)

( * ) Notice: Subject to any disclaimer, the term of this patent is extended or adjusted under 35 U.S.C. 154(b) by 814 days.

(21) Appl. No.: 10/378,773

(22) Filed: Mar. 4, 2003

(65) Prior Publication Data
US 2004/0175058 A1 Sep. 9, 2004

(51) Int. Cl.
*G06K 9/60* (2006.01)
*G06K 9/00* (2006.01)
*G06K 9/68* (2006.01)

(52) U.S. Cl. ...................... 382/305; 382/181
(58) Field of Classification Search ............... 382/159, 382/162, 165, 172, 173, 181, 218, 219, 224, 382/228, 239, 243, 305; 345/716, 719, 720, 345/723; 375/240.01, 240.05, 240.06; 348/142, 348/153, 207; 715/723; 386/38, 117; 717/124
See application file for complete search history.

(56) References Cited

U.S. PATENT DOCUMENTS

| 6,928,638 | B1 * | 8/2005 | Parvathala et al. ......... 717/124 |
| 2003/0058268 | A1 * | 3/2003 | Loui et al. ................ 345/719 |
| 2003/0234805 | A1 * | 12/2003 | Toyama et al. ............. 345/723 |
| 2004/0095374 | A1 * | 5/2004 | Jojic et al. ................ 345/716 |
| 2004/0175058 | A1 * | 9/2004 | Jojic et al. ................ 382/305 |
| 2004/0189691 | A1 * | 9/2004 | Jojic et al. ................ 345/720 |
| 2005/0047646 | A1 * | 3/2005 | Jojic et al. ................ 382/159 |

OTHER PUBLICATIONS

Burl, M. C., M. Weber, P. Perona, A probabilistic approach to object recognition using local photometry and global geometry, *Proc. 6th Europe Conf. Comp. Vision, ECCV*, 1998, pp. 628-641.
Chang, S.-F., W. Chen, H. J. Meng, H. Sundaram, and D. Zhong, A fully automated content-based video search engine supporting spatiotemporal queries, *IEEE Trans. on Circuits and Systems for Video Tech.*, Sep. 1998, vol. 8, No. 4, pp. 602-615.
De Bonet, J., and P. Viola, Structure driven image database retrieval, *Proc. of the 1997 Conf. on Advances in Neural Information Processing Systems 10*, Jul. 1998, Denver, Colorado, pp. 866-872.

(Continued)

Primary Examiner—Amir Alavi
(74) Attorney, Agent, or Firm—Lyon & Harr, LLP; Mark A. Watson

(57) ABSTRACT

Computationally efficient searching, browsing and retrieval of one or more objects in a video sequence are accomplished using learned generative models. The generative model is trained on an automatically or manually selected query sequence from a sequence of image frames. The resulting generative model is then used in searching, browsing or retrieval of one or more similar or dissimilar image frames or sequences within the image sequence by determining the likelihood of each frame under the learned generative model. Further, this method allows for automatic separation and balancing of various causes of variability while analyzing the image sequence. The generative models are based on appearances of multiple, possibly occluding objects in an image sequence. Further, the search strategies used include clustering and intelligent fast forward through the image sequence. Additionally, in one embodiment, a fast forward speed is relative to the current frame likelihood under the learned generative model.

49 Claims, 9 Drawing Sheets

OTHER PUBLICATIONS

Hadjidemetriou, E., M. D. Grossberg and S. K. Nayar, Spatial information in multiresolution histograms, *IEEE Comp. Society Conf. on Comp. Vision and Pattern Recognition*, CVPR'01, 2001, vol. 1, pp. 702-709.

Irani, M., P. Anandan, Video indexing based on mosaic representations, *IEEE Transactions on Pattern Analysis and Mach. Inteligence*, vol. 86, No. 5, 1998, pp. 905-921.

Jojic, N., B. Frey, Learning flexible sprites in video layers, *Proc. of IEEE Conf. on Comp. Vision and Pattern Recognition, (CVPR 01)*, 2001, pp. 199-206.

Jojic, N., N. Petrovic, B. Frey, and T. Huang, Transformed hidden Markov models: Estimating mixture models of images and inferring spatial transformations in video sequences, *IEEE Conf. on Comp. Vision and Pattern Recognition*, 2000, vol. 2, pp. 26-33.

Maron, O., A. L. Ratan, Multiple-instance learning for natural scene classification, *Proc. 15th Int'l Conf. on Machine Learning*, 1998, pp. 341-349.

Ngo, C.-W., T.-C. Pong, H.-J. Zhang, On clustering and retrieval of video shots, *Proc. of 9th ACM Multimedia Conf.*, 2001, pp. 51-60.

Pingali, G. S., A. Opalach, I. Carlbom, Multimedia retrieval through spatio-temporal activity maps, *ACM Multimedia*, 2001, pp. 129-136.

Rui, Y., A. Gupta, A. Acero, Automatically extracting highlights for TV baseball programs, *Proc. of 8th ACM Int'l Conf. on Multimedia*, Los Angeles, CA, 2000, pp. 105-115.

C. Schmid, Constructing models for content-based image retrieval, *Proc. IEEE Comp. Soc'y Conf. Comp. Vision and Pattern Recognition*, 2001, Hawaii, vol. 2, pp. 39-45

Stauffer, C., E. G. Miller, and K. Tieu, Transform-invariant image decomposition with similarity templates, *Advances in Neural Information Processing Systems 14*, MIT Press, Cambridge, MA, 2002, pp. 1295-1302.

Swain, M. J., and D. H. Ballard, Color indexing, *Int'l J. of Comp. Vision*, 1991, vol. 7, No. 1, pp. 11-32.

Tieu, K., and P. Viola, Boosting image retrieval, *Proc. of the IEEE Conf. on Comp. Vision and Patterns Recognition*, 2000, pp. 228-235.

Weber, M., M. Welling, and P. Perona, Unsupervised learning of models for recognition, *Proc. European Conf. on Comp. Vision*, 2000, pp. 18-32.

Wren, C., A. Azarbayejani, T. Darrell and A. Pentland. Pfinder: Real-time tracking of the human body, *IEEE Transactions on Pattern Analysis and Mach. Intelligence*, Jul. 1997, vol. 19, No. 7, pp. 780-785.

Zelnik-Manor, L., and M. Irani, Event-based analysis of video, *Proc. of the 2001 IEEE Comp. Soc'y Conf. on Comp. Vision and Pattern Recognition*, 2001, vol. 2, pp. 123-130.

* cited by examiner

Frame f     p(s=0|f)     p(s=1|f)     p(s=2|f)     p(s=3|f)

Frame f     p(s=0|f)     p(s=1|f)     p(s=2|f)     p(s=3|f)

SYSTEM AND METHOD FOR ADAPTIVE VIDEO FAST FORWARD USING SCENE GENERATIVE MODELS

BACKGROUND

1. Technical Field

The invention is related to searching, browsing and retrieval of images or image sequences from a video clip or other image sequence, and in particular, to a system and method for using a computationally efficient scene generative model in an automatic fully adaptive content-based analysis of the image sequence.

2. Related Art

Conventional schemes for searching through image sequences include content-based search engines that use various types of aggregate statistics over visual features, such as color or texture elements of frames in the image sequence. However, these schemes tend to be sensitive to the quality of the data. While professionally captured or rendered image sequences tend to be of high quality, often, a home video or the like is of relatively poor quality unsuited for use with such conventional schemes. For example, a typical home video or image sequence having bad or degraded color characteristics, or blurry or out of focus portions of scenes within the image sequence makes it difficult to recognize textures within that image sequence. As a result, these conventional statistics-based search engines perform poorly in such an environment.

However, a more serious limitation of existing schemes is that the spatial configuration of any particular scene is typically not encoded in the scene description, thereby making analysis of the image sequence more difficult. In order to address this concern, one conventional scheme attempts to preserve some of the spatial information using multiresolution color histograms. Other approaches attempt to circumvent the lack of global spatial information in representations based on local features by working with a large number of features and automatically selecting the most discriminative ones.

In either case, the conventional approaches that attempt to model the spatial layout of particular regions within an image sequence are subject to several limitations. In particular, the limitations of conventional spatial-layout based schemes include the amount of user interaction required for specifying positive and negative examples, the small size of foreground objects that can be modeled, thereby limiting the application domain, and the necessity of handcrafting cost functions that need to be manually weighted.

Another conventional scheme has attempted to jointly model motion and appearance by using derivatives in the space-time volume for searching through image sequences. However, this scheme is both complicated and computationally inefficient.

Yet another conventional scheme provides a comprehensive search engine that allows for a motion-based search based on a query consisting of region appearances and sketched motion patterns. This search engine is typically used by professional users searching for particular actions or activities in professional sporting events such as soccer. However, this scheme requires a significant amount of user input in order to identify scenes or image sequences of interest, and is not ideally suited for home use.

Therefore, what is needed is a computationally efficient system and method for automatically searching or browsing through videos or other image sequences to identify scenes or image sequences of interest. Further, such a system and method should be adapted to work well with either high quality image data, such as a typical television type broadcast, or with relatively poor quality image data, such as, for example, a typical home video or image sequence. Finally, such a system and method should require minimal user input to rapidly and automatically identify image scenes or sequences of interest to the user.

SUMMARY

An "image sequence analyzer," as described herein, provides for computationally efficient searching, browsing and retrieval of one or more objects, frames or sequences of interest in video or image sequences. In general, the ability to search, browse, or retrieve such information in a computationally efficient manner is accomplished by first providing or identifying a query sample, consisting of a sequence of image frames representing a scene or sequence of interest. A probabilistic generative model, which models multiple, possibly occluding objects in the query sample, is then automatically trained on the query sample. Next one or more image frames are then compared to the generative model, with a likelihood under the generative model being used to identify image frames or sequences which are either similar or dissimilar to the original query sample.

In one embodiment, searching, browsing and retrieval of one or more objects in video or image sequences is accomplished given a minimal user input, consisting simply of identifying a representative image sequence to be used for training a generative model. Given this input, the generative model is automatically learned, and then used in analyzing one or more videos or image sequences to identify those frames or sequences of the overall image sequence that are similar to the image sequence used to learn the generative model.

Conversely, in an alternate embodiment, the learned generative model is used in analyzing one or more videos or image sequences to identify those frames or sequences of the overall image sequence that are dissimilar to the image sequence used to learn the generative model. This embodiment is particularly useful for identifying a typical or unusual portions of a relatively unchanging or constant image sequence or video, such as movement in a fixed surveillance video, or a long video of a relatively unchanging ocean surface that is only occasionally interrupted by a breaching whale.

In general, the aforementioned scene generative model, which is trained on the query sample, describes a spatial layout of multiple, possibly occluding objects, in a scene. This generative model represents a probabilistic description of the spatial layout of multiple, possibly occluding objects in a scene. In modeling this spatial layout, any of a number of features may be used, such as, for example, object appearance, texture, edge strengths, orientations, color, etc. However, for purposes of explanation, the following discussion will focus on the use of R, G, and B (red, green and blue) color channels in the frames of an image sequence for use in learning scene generative models for modeling the spatial layout of objects in the frames of the image sequence. In particular, objects in the query sample are modeled using a number of probabilistic color "blobs."

In one embodiment, the number of color blobs used in learning the scene generative model is fixed. In another embodiment, the number of color blobs to be used is provided as an adjustable user input. Further, in yet another embodiment, the number of color blobs is automatically estimated from the data using conventional probabilistic techniques such as, for example, evidence-based Bayesian model selection and minimum description length (MDL) criterion for estimating a number of blobs from the data.

In general, given the number of color blobs to be used, along with a query sample drawn from an image sequence, the generative model is learned through an iterative process which cycles through the frames of the query sample until model convergence is achieved. The generative model models an image background using zero color blobs for modeling the image sequence representing the query sample, along with a number of color blobs for modeling one or more objects in query sample. The generative model is learned using a variational expectation maximization (EM) algorithm which continues until convergence is achieved, or alternately, until a maximum number of iterations has been reached. As is well known to those skilled in the art, a variational EM algorithm is a probabilistic method which can be used for estimating the parameters of a generative model.

Once the scene generative model is computed, it is then used to compute the likelihood of each frame of an image sequence as the cost on which video browsing, search and retrieval is based. Further, in one embodiment, once learned, one or more generative models are stored to a file or database of generative models for later use in analyzing either the image or video sequence from which the query sample was selected, or one or more separate image sequences unrelated to the sequence from which the query sample was selected.

In addition to the just described benefits, other advantages of the image sequence analyzer will become apparent from the detailed description which follows hereinafter when taken in conjunction with the accompanying drawing figures.

DESCRIPTION OF THE DRAWINGS

The specific features, aspects, and advantages of the image sequence analyzer will become better understood with regard to the following description, appended claims, and accompanying drawings where:

DETAILED DESCRIPTION OF THE PREFERRED EMBODIMENTS

In the following description of the preferred embodiments of the image sequence analyzer, reference is made to the accompanying drawings, which form a part hereof, and in which is shown by way of illustration specific embodiments in which the invention may be practiced. It is understood that other embodiments may be utilized and structural changes may be made without departing from the scope of the present invention.

Figure 1:
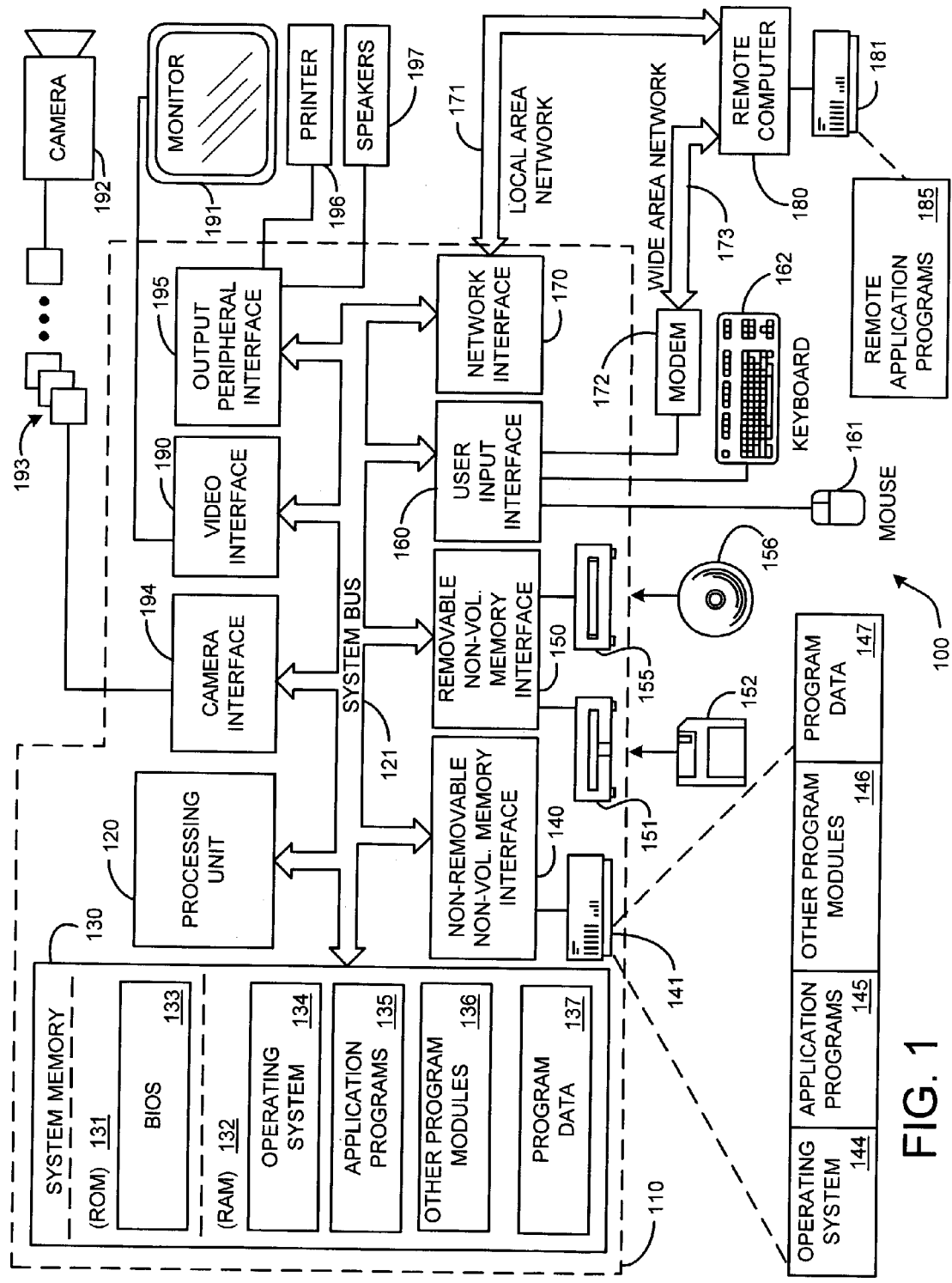
FIG. 1 is a general system diagram depicting a general-purpose computing device constituting an exemplary system for using generative models in an automatic fully adaptive content-based analysis of image sequences.

1.0 Exemplary Operating Environment:

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held, laptop or mobile computer or communications devices such as cell phones and PDA's, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc., that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices. With reference to FIG. 1, an exemplary system for implementing the invention includes a general-purpose computing device in the form of a computer 110.

Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes volatile and nonvolatile removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media.

Note that the term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media.

Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad.

Other input devices (not shown) may include a microphone, joystick, game pad, satellite dish, scanner, radio receiver, or a television or broadcast video receiver, or the like. These and other input devices are often connected to the processing unit 120 through a user input interface 160 that is coupled to the system bus 121, but may be connected by other interface and bus structures, such as, for example, a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

Further, the computer 110 may also include, as an input device, a camera 192 (such as a digital/electronic still or video camera, or film/photographic scanner) capable of capturing a sequence of images 193. Further, while just one camera 192 is depicted, multiple cameras could be included as input devices to the computer 110. The use of multiple cameras provides the capability to capture multiple views of an image simultaneously or sequentially, to capture three-dimensional or depth images, or to capture panoramic images of a scene. The images 193 from the one or more cameras 192 are input into the computer 110 via an appropriate camera interface 194. This interface is connected to the system bus 121, thereby allowing the images 193 to be routed to and stored in the RAM 132, or any of the other aforementioned data storage devices associated with the computer 110. However, it is noted that image data can be input into the computer 110 from any of the aforementioned computer-readable media as well, without requiring the use of a camera 192.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

The exemplary operating environment having now been discussed, the remaining part of this description will be devoted to a discussion of the program modules and processes embodying a system and method for automatically learning computationally efficient scene generative models for use in an automatic fully adaptive content-based analysis of one or more image sequences.

2.0 Introduction:

An "image sequence analyzer" as described herein uses computationally efficient scene generative models in an automatic fully adaptive content-based analysis of one or more image sequences for classifying those image sequences, or otherwise identifying content of interest in the image sequences. In general, the "image sequence analyzer," as described herein, provides for computationally efficient searching, browsing and retrieval of one or more objects, frames or sequences of interest in video or image sequences. The ability to search, browse, or retrieve such information in a computationally efficient manner is accomplished by first providing or identifying a query sample, consisting of a sequence of image frames representing a scene or sequence of interest. A probabilistic scene generative model, which models multiple, possibly occluding objects in the query sample, is then automatically trained on the query sample. Next one or more image frames are then compared to the generative model, with a likelihood under the generative model being used to identify image frames or sequences which are either similar or dissimilar to the original query sample.

2.1 System Overview:

The two extremes in the design of similarity measures for media search and retrieval are the use of very simple aggregate feature statistics and the use of complex, manually defined measures involving appearance, spatial layout and motion. Using a generative model that explains an image scene in terms of its components, including appearance and motion of various objects has the advantage that while it stays simple to use it can still capture the various concurrent causes of variability in the sequence presented as a query. Both of these properties come from prescribing to a machine learning paradigm, in which the model adapts to the data, automatically balancing various causes of variability.

As described in detail below, in the process of integrating hidden variables in order to come up with a single likelihood number under a generative model, each image frame in an image sequence is automatically broken into components and the similarity to the model is computed according to learned amounts of variability in various parts of the generative model. However, the ultimate cost depends on how likely the learned generative model is to generate each observed frame. Consequently, any of the multiple possible ways to explain the training data is usually satisfactory, as long as the structure of the generative model and the number of parameters are limited to avoid overtraining. The generative model structure described below mimics the structure of the real world in terms of the existence of multiple objects possibly occluding each other and slightly changing shape, position and appearance.

The system and method described herein for uses computationally efficient scene generative models in an automatic fully adaptive content-based analysis of image sequences provides many advantages. For example, it allows a user to quickly identify or catalog the contents of one or more videos or other image sequences, while requiring only minimal user input and interaction.

For example, in one embodiment, analysis of one or more image sequences is accomplished given a minimal user input, consisting simply of identifying a representative image sequence to be used for training the scene generative model, i.e., the aforementioned query sample. Given this input, the generative model is automatically learned, and then used in analyzing one or more videos or image sequences to identify those frames or sequences of the overall image sequence that are similar to the image sequence used to learn the generative model. Conversely, in an alternate embodiment, the learned generative model is used to identify those frames or sequences of the overall image sequence that are dissimilar to the query sample. This embodiment is particularly useful for identifying a typical or unusual portions of a relatively unchanging or constant image sequence or video, such as movement in a fixed surveillance video, or short segments of a long video of a relatively unchanging ocean surface that is only occasionally interrupted by a breaching whale.

As noted above, the generative model is trained on a query sample which represents a user selected sequence of images of interest that are drawn from an image sequence. In general, the aforementioned scene generative model represents a probabilistic description of the spatial layout of multiple, possibly occluding objects in a scene. In modeling this spatial layout, any of a number of features may be used, such as, for example, object appearance, texture, edge strengths, orientations, color, etc. However, for purposes of explanation, the following discussion will focus on the use of R, G, and B (red, green and blue) color channels in the frames of an image sequence for use in learning scene generative models for modeling the spatial layout of objects in the frames of the image sequence. Further, it should be appreciated by those skilled in the art that the image sequence analyzer described herein is capable of working equally well with any of a number of types of scene generative models for modeling the spatial layout of a sequence of images, and that the image sequence analyzer is not limited to use of the color blob-based scene generative models described below.

As noted above, objects in the query sample are modeled using a number of probabilistic color "blobs." In one embodiment, the number of color blobs used in learning the scene generative model is fixed, while in alternate embodiments, the number of color blobs to be used is provided either as an adjustable user input, or automatically estimated using conventional probabilistic techniques to analyze the selected image sequence to determine a number of discrete areas or blobs within the image sequence.

Given the number of color blobs to be used, along with a query sample drawn from an image sequence, the generative model is learned through an iterative process which cycles through the frames of the query sample until model convergence is achieved. The generative model models an image background using zero color blobs for modeling the image sequence representing the query sample, along with a number of color blobs for modeling one or more objects in query sample. The generative model is learned using a variational expectation maximization (EM) algorithm which continues until convergence is achieved, or alternately, until a maximum number of iterations has been reached.

In particular, in one embodiment an expectation step of the EM analysis maximizes a lower bound on a log-likelihood of each image frame by inferring approximations of variational parameters. Similarly, a maximization step of the EM analysis automatically adjusts model parameters in order to maximize a lower bound on a log-likelihood of each image frame. These expectation and maximization steps are sequentially iterated until convergence of the variational parameters and model parameters is achieved. As is well known to those skilled in the art, a variational EM algorithm is a probabilistic method which can be used for estimating the parameters of a generative model. Note that the process briefly summarized above for learning the generative models is described in detail below in Section 3.

Finally, once the scene generative model is computed, it is then used to compute the likelihood of each frame of an image sequence as the cost on which video browsing, search and retrieval is based. Further, in one embodiment, once learned, one or more generative models are stored to a file or database of generative models for later use in analyzing either the image or video sequence from which the query sample was selected, or one or more separate image sequences unrelated to the sequence from which the query sample was selected.

Figure 2:
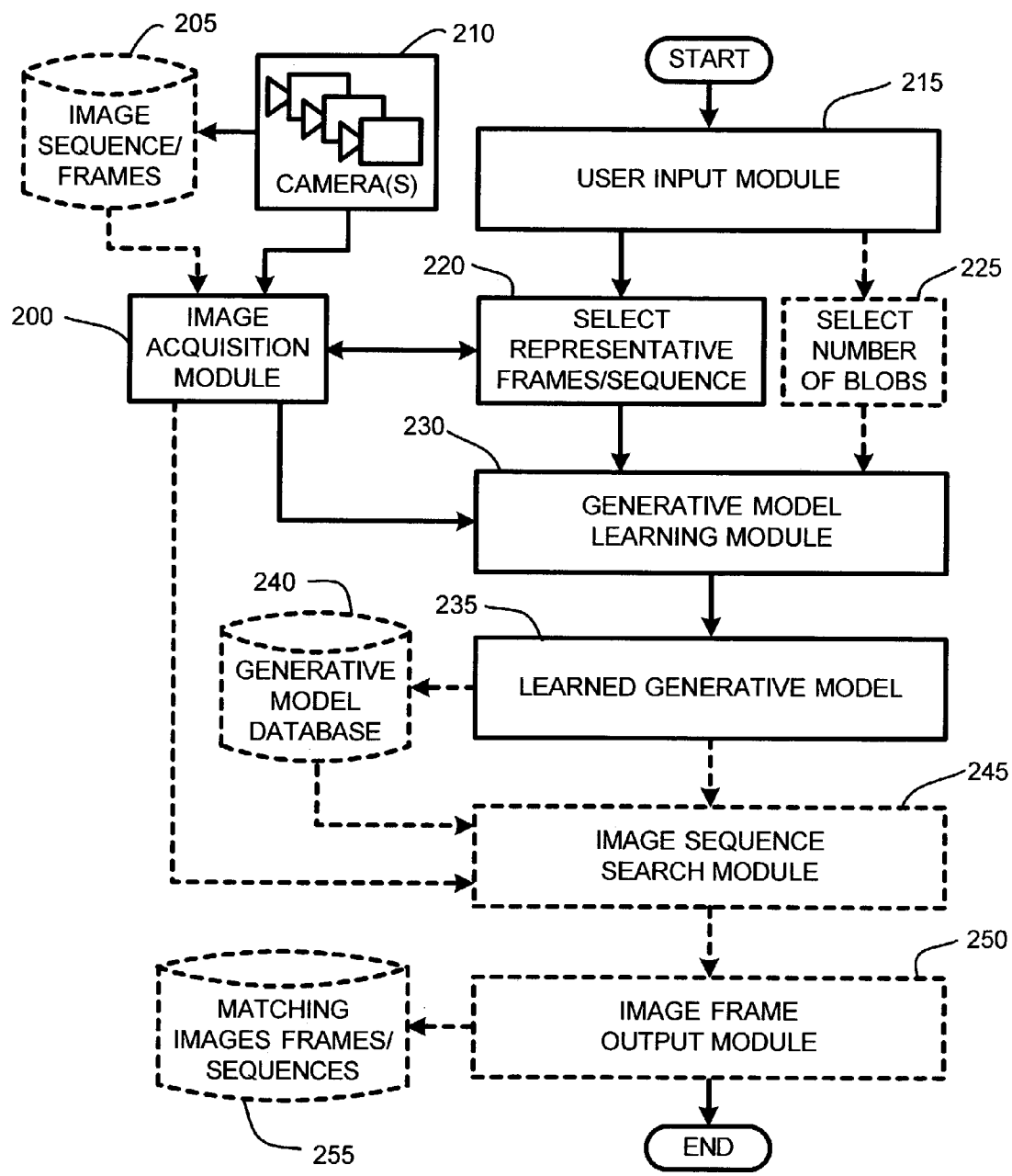
FIG. 2 illustrates an exemplary architectural diagram showing exemplary program modules for using generative models in an automatic fully adaptive content-based analysis of image sequences.

2.2 System Architecture:

The general system diagram of FIG. 2 illustrates the processes generally described above. In particular, the system diagram of FIG. 2 illustrates interrelationships between program modules for implementing an "image sequence analyzer" that uses computationally efficient scene generative models in an automatic fully adaptive content-based analysis of image sequences. It should be noted that the boxes and interconnections between boxes that are represented by broken or dashed lines in FIG. 2 represent alternate embodiments of the image sequence analyzer, and that any or all of these alternate embodiments, as described below, may be used in combination with other alternate embodiments that are described throughout this document.

In general, as illustrated by FIG. 2, a system and method for using computationally efficient scene generative models in an automatic fully adaptive content-based analysis of image sequences begins by using an image acquisition module 200 to read a sequence of one or more image frames 205 from a file or database, or alternatively, directly from one or more cameras 210.

A user input module 215 is then used to access and view the image sequence using a conventional display device for the purpose of selecting a query sample 220 from the image sequence. As noted above, this query sample 220 represents a user selected sequence of representative image frames that are drawn from the image sequence 205. As described below, this query sample 220 is then used in learning the generative model. Further, in one embodiment wherein the aforementioned color blob-based generative model is used, the user input module 215 also allows a user to input or select a desired number of blobs 225.

Next, a generative model learning module 230 then begins an iterative variational expectation maximization process for learning a generative model 235 based on the input query sample 220 and the specified number of blobs 225. In general, as described in greater detail below, this iterative variational expectation maximization process operates by using a variational probabilistic inference to infer the parameters of the generative model 235. The iterative variational expectation maximization process performed by the generative model learning module 230 serves to decompose the input image frames of the query sample into individual components consisting of the generative model.

In general, the generative model decomposes the query sample into a background model and number of blob models. In particular, as described in greater detail below in Section 3, the generative model parameters for the embodiment using a color blob-based generative model include spatial covariance matrices of the blobs, blob color distribution parameters, blob sizes, and a scene background model. Note that the eigen values of the spatial covariance matrices of the blobs control the size of each blob. In combination, these components form a unique learned generative model 235 for the input query sample 220.

In one embodiment, the learned generative model 235 is then stored to a generative model database or file 240 for later use in analyzing one or more image sequences to identify image frames or sequences which are either similar, or conversely, dissimilar, to the image sequence of the query sample 220, as described in greater detail below.

Next, whether the learned generative model 235 is used immediately, or is simply stored 240 for later use, the generative model is then provided to an image sequence search module 245. The image sequence search module 245 then compares each frame of the image sequence 205 to the generative model 235 to determine a likelihood of the current image frame under the generative model. In other words, image sequence search module 245 uses the generative model 235 to compute a probability that each frame of the image sequence 205 was generated by the generative model. Given the probability computed by the image sequence search module 245, it is a then simple matter to determine whether the current image frame of the image sequence 205 is similar, or alternately, dissimilar, to the image sequence representing the query sample 220.

In particular, an image frame output module 250 simply compares the probability computed for each image frame by the image sequence search module 245 to a similarity threshold. If the probability is greater than the similarity threshold, then the image frame output module 250 identifies the current frame as a matching or similar image frame. Conversely, if the probability is less than or equal to the similarity threshold, then the image frame output module 250 identifies the current frame as a non-matching or dissimilar image frame. In either case, in one embodiment, the image frame output module 250 then stores either the matching or non-matching image frames, or pointers to those image frames to a file or database 255 for later use or review, as desired.

Note that in one embodiment (see FIG. 7), the aforementioned similarity threshold is adjustable to allow for greater flexibility identifying similar and dissimilar image frames.

3.0 Operation Overview:

As noted above, the image sequence analyzer generally operates by using computationally efficient scene generative models in an automatic fully adaptive content-based analysis of image sequences. Specific details regarding implementation of the image sequence analyzer are provided in the following sections.

3.1 Generative Models:

In general, as is well known to those skilled in the art, a generative model is a type of probabilistic model that may be used to generate hypothetical data.

Ideally, this hypothetical data will either match, or approximate within acceptable limits, the data actually observed on the system modeled. For example, a generative model of an observed image scene may be used in an attempt to model or approximate that observed image scene. If a probability that the generative model could have actually produced the observed image scene is sufficiently large, then it can be said that the generative model sufficiently approximates the observed image scene, and that the observed image scene is therefore similar to the data on which the generative model was trained.

Conversely, if the probability is sufficiently small, then it can be said that the generative model does not sufficiently approximate the observed image scene, and that the observed image scene is therefore dissimilar to the data on which the generative model was trained.

The system and method described herein uses generative models for modeling the spatial layout of objects within the frames of an image sequence. In modeling this spatial layout, any of a number of features may be used, such as, for example, object appearance, texture, edge strengths, orientations, color, etc. However, it should be appreciated by those skilled in the art that the image sequence analyzer described herein is capable of working equally well with any of a number of types of scene generative models for modeling the spatial layout of a sequence of images, and that the image sequence analyzer is not limited to use of the color-based scene generative models described herein.

As noted above, any of a number of generative models may be adapted for use by the image sequence analyzer described herein. However, for ease of explanation, the following discussion will focus on the use of R, G, and B (red, green and blue) color channels in the frames of an image sequence, i.e. the "query sample," for use in learning scene generative models for modeling the spatial layout of objects in the frames of the image sequence. In particular, objects in the query sample are modeled using a number of probabilistic color "blobs." In one embodiment, the number of color blobs used in learning the scene generative model is fixed, while in alternate embodiments, the number of color blobs to be used is provided either as an adjustable user input, or is automatically probabilistically estimated. As described in further detail below, given this color blob-based generative model, the model parameters include spatial covariance matrices of the blobs, blob color distribution parameters, blob sizes, and a scene background model.

3.1.1 Variational Expectation-Maximization for Generative Models:

In general, as is well known to those skilled in the art, an EM algorithm is often used to approximate probability functions such as generative models. EM is typically used to compute maximum likelihood estimates given incomplete samples. In the expectation step (the "E-Step"), the model parameters are assumed to be correct, and for each input image, probabilistic inference is used to fill in the values of the unobserved variables, e.g., spatial covariance matrices of the blobs, blob color distribution parameters, blob sizes, and a scene background model. In the maximization step (the "M-Step"), these model parameters are adjusted to increase the joint probability of the observations and the filled in unobserved variables. These two steps are then repeated or iterated until convergence of the generative model is achieved.

In fact, for each input image, the E-Step fills in the unobserved variables with a distribution over plausible configurations (the posterior distribution), and not just over individual configurations. This is an important aspect of the EM algorithm. Initially, the parameters are a very poor representation of the data. So, any single configuration of the unobserved variables (e.g., the most probable configuration under the posterior) will very likely be the wrong configuration. The EM algorithm uses the exact posterior in the E-Step and maximizes the joint probability with respect to the model parameters in the M-Step. Thus, the EM algorithm consistently increases the marginal probability of the data, performing maximum likelihood estimation.

However, in some cases, the joint probability cannot be directly maximized. In this case, a variational EM algorithm uses the exact posterior in the E-Step, but just partially maximizes the joint probability in the M-Step, e.g., using a nonlinear optimizer. The variational EM algorithm also consistently increases the marginal probability of the data. More generally, not only is an exact M-Step not possible, but computing the exact posterior is intractable. Thus, variational EM is used to learn the model parameters from an image sequence representing the query sample. The variational EM algorithm permits the use of an approximation to the exact posterior in the E-Step, and a partial optimization in the M-Step. The variational EM algorithm consistently increases a lower bound on the marginal probability of the data. As with EM algorithms, variational EM algorithms are also well known to those skilled in the art.

3.1.2 Generative Scene Models:

The color blob-based generative model described herein, is based on a generation of feature vectors $f_c(i,j)$, where c is one of C features modeled for each pixel i,j. These features can include texture, edge strengths, orientations, color, intensity, etc. However, for purposes of explanation, the following discussion will be limited to R, G and B color channels. As illustrated by FIG. 3, the image features can be generated from several models indexed by s. Note that while not required, for computational efficiency, only one of the blob models (s=0) is used to model each pixel with a separate mean and variance in each color channel to provide a background model, while the rest of the objects in the image frames are modeled as blobs. Note that these blobs have spatial and color means and variances that apply equally to all pixels.

Figure 3A:
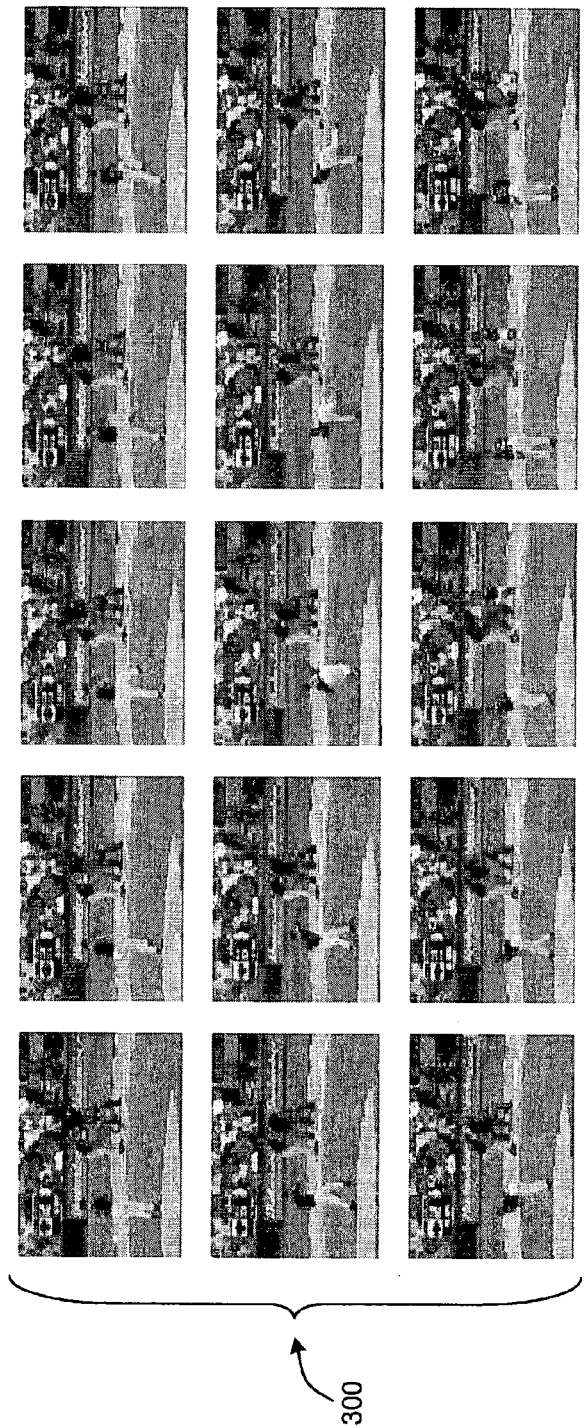
FIG. 3A illustrates an exemplary set of image frames used in learning a generative model.
Figure 3B:
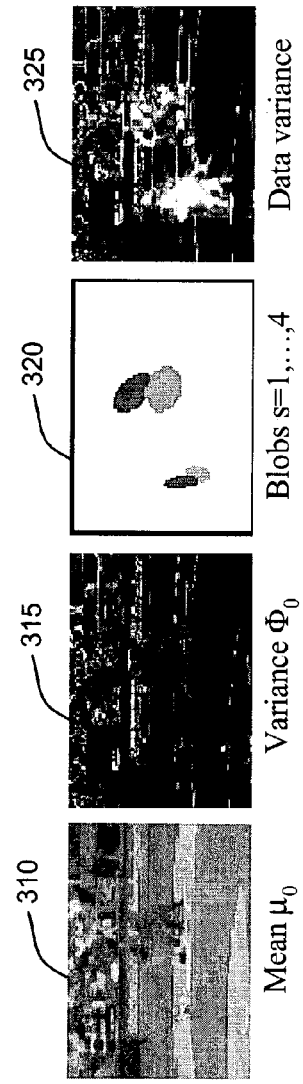
FIG. 3B illustrates the spatial layout of background and foreground objects learned from the image frames of FIG. 3A using blobs as object models.

For example, FIG. 3A shows several frames 300 from a five-second clip of pitching in a professional baseball game, while FIG. 3B shows the spatial layout of background and foreground objects learned from the frames 300 using four blobs as object models. While four blobs were chosen for this example, it should be noted that this number has no particular significance. Specifically, blob models 320 capture the foreground object and thus, as illustrated by 310 the pitcher is automatically removed from the mean background. Note the difference in the variance of the learned background 315 and the pixel variances 325 learned from the frames 300.

In learning the generative models, pixel generation is assumed to start with the selection of the object model s, by drawing from the prior p(s), followed by sampling from appropriate distributions over the space and color according to p([i j]|s) and p($g_c$(i, j),|s,i, j), where:

$$p([ij]/s=0)=u(\text{uniform distribution}) \quad \text{Equation 1}$$

$$p([ij]/s\neq 0)=N([ij]^T; \gamma_s, \Gamma_s) \quad \text{Equation 2}$$

$$p(g_c|s=0,i,j)=N(g_c;\mu_{0,c}(i,j),\Phi_{0,c}(i,j)) \quad \text{Equation 3}$$

$$p(g_c(i,j)|s\neq 0,i,j)=N(g_c;\mu_{s,c},\Phi_{s,c}) \quad \text{Equation 4}$$

where N denotes a Gaussian (normal) distribution.

As noted above, FIG. 3B illustrates mean and variance images $\mu_{0,c}$(i,j) and $\Phi_{0,c}$(i,j), 310 and 315 respectively, for the model s=0, which captures a background of the scene. Note that in FIG. 3B, the variances, 315 and 325, are shown in gray intensities for easier viewing, although they are actually defined in the RGB color space. The blobs are illustrated by showing all pixels within a standard deviation along each principal component of $\Gamma_s$ painted in the mean color $\mu_{s,c}$ where c is the color channel (R, G or B). Further, although not illustrated by FIG. 3B, the blobs 320 also have a color covariance matrix $\Phi_{s,c}$.

After generating the hidden pixel$g_c$(i,j), it is then shifted by a random shift (m,n) to generate a new pixel $f_c$(i', j')=$f_c$(i+m,j+n)=$g_c$(i,j), i.e., $$p(f_c,g_c)=\delta(f_c-g_c);\ p(i',j'|i,j,m,n)=\delta(i+m-i',j+n-j')$$

The images are then assumed to be generated by repeating this sampling process K times, where K is the number of pixels, and an image sequence is generated by repeating the image generation T times, where T is the number of frames in the image sequence. There are several variants of this model, depending on which of the hidden variables are shared across the space, indexed by pixel number k, and time indexed by t. Note that in the data there is a 1-to-1 correspondence between pixel index k and the position (i', j'), which is the reason why the coordinates are not generated in the models. However, in order to allow the blobs to have their spatial distribution, it is necessary to treat coordinates as variables in the model, as well. Consequently, the generative model creates a cloud of points in the space-time volume that in case of the real video clips or image sequences fill up that space-time volume.

Camera shake in an image sequence is modeled as an image shift, (m,n). The camera shake is best modeled as varying through time, but being fixed for all pixels in a single image. It makes sense to use a single set of parameters for detailed pixel model s=0, as this model is likely to focus on the unchanging background captured in $\mu_{0,c}$. The changes in the appearance of the background can be well captured in the variance $\Phi_{0,c}$ and the camera shake (m,n). However, the blob parameters $\gamma_s,\gamma_s$ can either be fixed throughout the sequence or allowed to change, thus tracking the objects not modeled by the overall scene model$\mu_{0,c}$(i,j), and $\Phi_{0,c}$(i, j).

In one embodiment, the blob spatial variances $\Gamma_s$ are kept fixed, thus regularizing the size of the object captured by the model, while letting $\gamma_s$ vary through time, thereby allowing the object to move without changing drastically its size. Note that due to the statistical nature of the blob's spatial model, it can always vary its size, but keeping the variances fixed limits the amount of the change. In this version of the model, $\gamma_s$ becomes another set of hidden variables, for which a uniform prior is assumed. Thus, the joint likelihood over all observed and unobserved variables is:

$$p(\{\{S_{k,t},i_{k,t},j_{k,t},i'_{k,t},j'_{k,t},g_{c,k,t},f_{c,k,t}\}_{k=1,\ldots,K};\gamma_{s,t},m_t,n_t\}_{t=1,\ldots,T}) \quad \text{Equation 6}$$

which can be expressed as the product of the appropriate terms in Equations 1 through 5 for all k,t. The joint likelihood is a function of the model parameters θ that include the spatial covariance matrices of the blobs $\Gamma_s$, the blob color distribution parameters, $\mu_{s,c}$ and $\Phi_{s,c}$, the scene background model$\mu_{0,c}$(i,j) and $\Phi_{0,c}$(i, j), and the blob sizes $\Gamma_s$. To compute the likelihood of the data f(i', j'), all other hidden variables h=$\{s_{k,t},i_{k,t},j_{k,t},i'_{k,t},j'_{k,t},g_{c,k,t},f_{c,k,t},\gamma_{s,t},m_t,n_t\}$ need to be integrated out, which can be efficiently done with the help of an auxiliary function q(h), that plays the role of an approximate or an exact posterior:

$$\log p(f) = \int_h p(f,h)dh \quad \text{Equation 7}$$

$$= \log \int_h q(h)p(f,h)/q(h)dh$$

$$\geq \log \int_h q(h)[\log p(f,h) - \log q(h)] = B(\psi,\theta)$$

where θ represents the model parameters and ψ represents the parameters of the auxiliary function q. The above bound is derived directly from "Jensen's inequality," which is well known to those skilled in the art. When q has the same form as the exact posterior q(h|f), the above inequality becomes equality and optimizing the bound B with respect to ψ is equivalent to Bayesian inference. If a simplified form of the posterior q is used, then ψ can still be optimized for, thus getting q as close to the true posterior as possible. In particular, the following assumptions are made: 1) a factorized posterior with simple multinomial distributions on segmentation s and transformation m,n; a Gaussian distribution on g; and a Dirac (impulse) on i, j, since the observed i', j' together with the shift m,n uniquely define i,j. Thus, $$q=\Pi_t q(\gamma_{s,t})q(m_t,n_t)\Pi_{i,j}q(s_t)\delta(i+m-i',j+n-j') \times N(g_{c,t};v_t,(i,j),\partial_t(i,j)) \quad \text{Equation 10}$$

Figure 4:
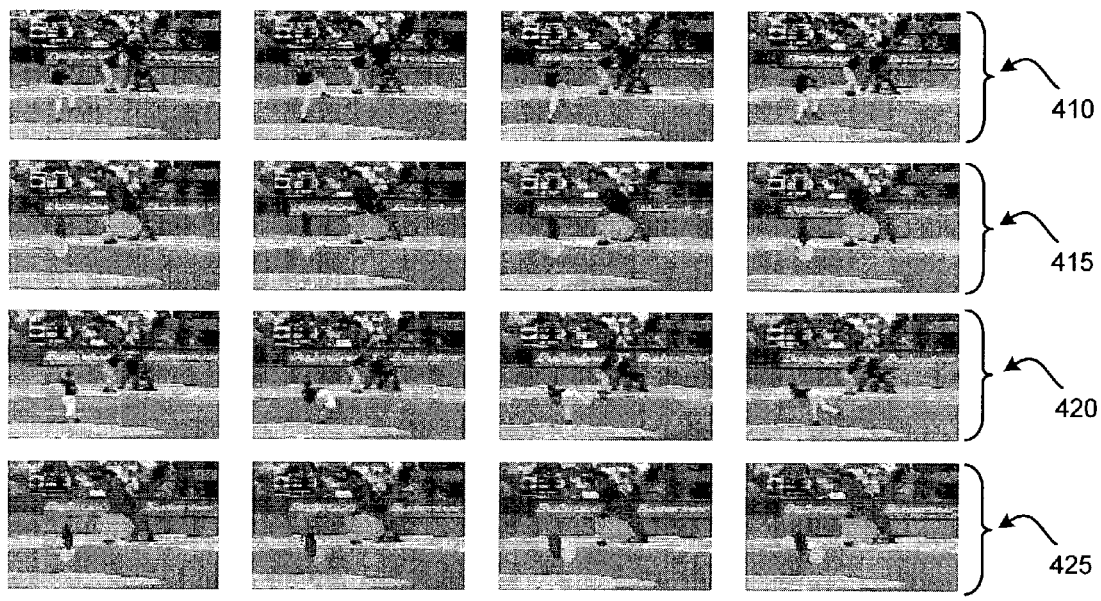
FIG. 4 illustrates the results of the inference with respect to several image frames using the model shown in FIG. 3B.

As noted previously, inference is performed by solving $\partial B/\partial \psi=0$ where ψ includes the mean and variance of latent images g, ν(i,j), $\partial$(i,j); and the values of the discrete distributions q($s_t$(i,j)), q($m_t,n_t$) and q($\gamma_{s,t}$). For example, FIG. 4 illustrates the results of the inference on $\gamma_{s,t}$ using the model shown in FIG. 3B. In particular, FIG. 4 illustrates inferred blob positions $\gamma_{s,t}$ (second and fourth row, 415 and 425, respectively) in 8 frames of the video sequence 300 of FIG. 3B (first and third row, 410 and 420, respectively) using the model illustrated in FIG. 3B.

To perform learning from a query sample, the bound optimizations are alternated with respect to the inference parameters ψ and model parameters θ as illustrated by the following iterative variational EM procedure:

(0) Initialize parameters randomly.
(1) Solve $\partial B/\partial \psi=0$, keeping θ fixed.
(2) Solve $\partial B/\partial \theta=0$, keeping ψ fixed.
(3) Loop steps 1 and 2 until convergence.

For the color blob-based model described herein, this variational EM procedure is very efficient, and typically converges in 10 to 20 iterations, while steps (1) and (2) above reduce to solving linear equations. In a tested embodiment, the model parameters for a 150-frame query sample image sequence are typically learned in a few iterations. As noted above, FIG. 3B provides an example of a learned generative model.

As noted above, the model parameters are initialized randomly, or in an alternate embodiment, using a first order fit to the data perturbed by some noise. Further, the iterative procedure described above provides improvement of the bound in each step, with eventual convergence, but does not provide a global optimality. Consequently, with such models, the issue of sensitivity to initial conditions can be of concern. However, although the model captures various causes of variability, the model's purpose is to define a likelihood useful for a search engine of some sort, rather than to perform perfect segmentation or tracking. Due to the structure of the model that describes various objects, their changing appearance, positions and shapes as well as potential camera shake, the training usually results in a reasonable explanation of the scene that is useful for detecting similar scenes. In other words, the model's ability to define the measure of similarity is much less sensitive to the initial conditions.

3.2 Scene Mixtures:

The parameters of the generative model can be allowed to change occasionally to represent significant changes in the scene. Keeping the same generative framework, this functionality can be easily added to the image sequence analyzer described herein by adding a "scene class variable" c (not to be confused with the color channels in the previous section), and using multiple sets of model parameters $\theta_c$ describing various scenes. The joint likelihood of the observed frame and all the hidden variables is then provided by Equation 11 as:

$$p(c,h,f) = p(c)p(h,f|\theta_c) \qquad \text{Equation 11}$$

Figure 5:
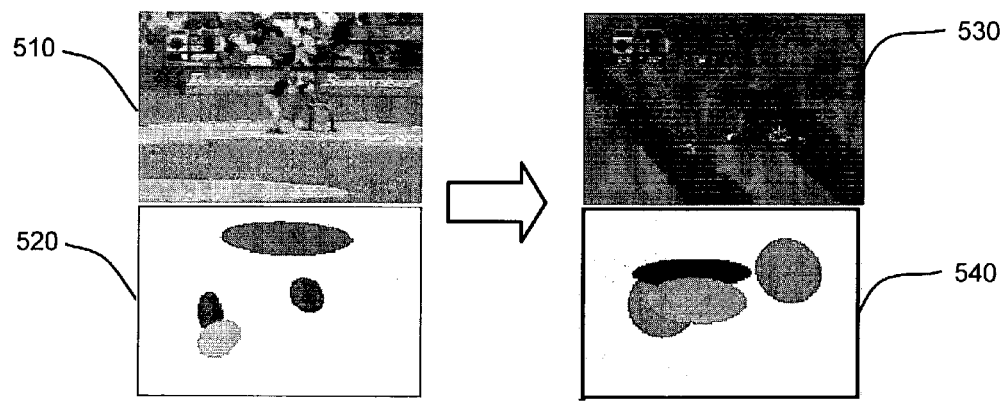
FIG. 5 illustrates the use of a mixture of different scenes, i.e., a pitching scene and a green field, for training a scene mixture model.

This model can be used to automatically cluster the frames in a video or image sequence. In particular, to capture some of the temporal consistencies at various time scales, a class index c, camera movement m,n, the blob positions $\gamma_s$ and even the segmentation s(i, j) are conditioned on the past values. The parameters of these conditional distributions are learned together with the rest of the parameters. The most interesting of these temporal extensions is the one focused on scene cluster c, as it is at the highest representational level. For example, as illustrated by FIG. 5, a pitching scene 510, with blob model 520, when followed by a shot of a green field 530, is likely to indicate a play such as a hit ball. Consequently, training a mixture of two scenes on a play using a temporal model is illustrated by Equation 12 as:

$$p(c_t,h_t,f_t) = p(c_t|c_{t-1})p(h_t,f_t|\theta_{ct}) \qquad \text{Equation 12}$$

The inference and learning rules for this mixture are derived in the same way as described above in Section 3.1.2 for the single scene generative model. Further, a well known solution to such inference is known in Hidden Markov Model (HMM) theory as "Baum-Welch" or "forward-backward algorithms." As such solutions are well known to those skilled in the art, they will not be described in further detail herein.

4.0 System Operation:

As noted above, the program modules described in Section 2.2 with reference to FIG. 2, and in view of the detailed description provided in the preceding Sections, are employed in an "image sequence analyzer" for which uses computationally efficient scene generative models in an automatic fully adaptive content-based analysis of image sequences. This process is depicted in the flow diagrams of FIG. 6 and FIG. 7. In particular, FIG. 6 illustrates an exemplary process for learning generative models based on a query sample input, while FIG. 7 illustrates an exemplary process for using the learned generative models in searching one or more input image sequences to identify similar, or dissimilar, image frames.

Figure 6:
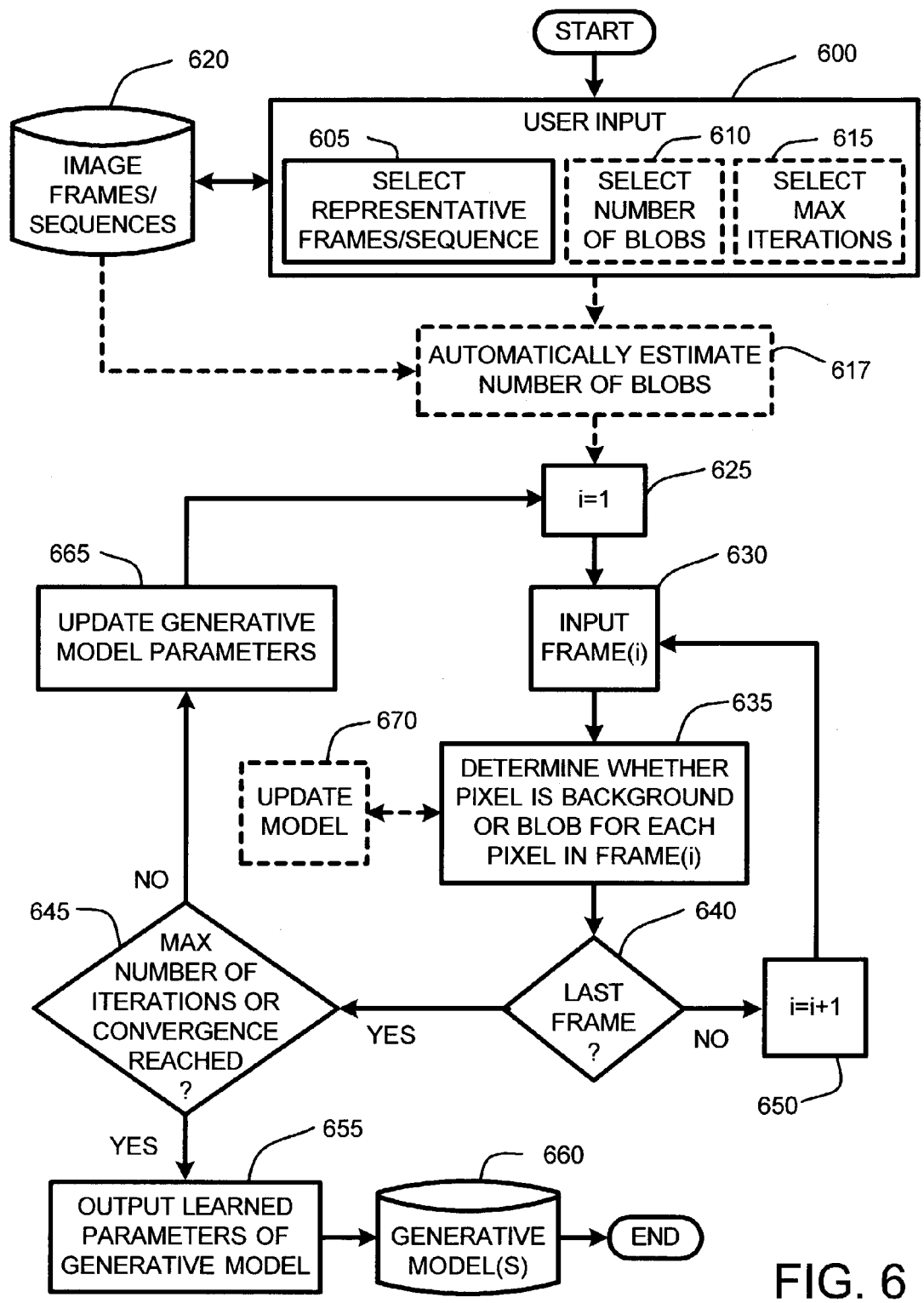
FIG. 6 illustrates an exemplary process for learning generative models based on a query sample input.
Figure 7:
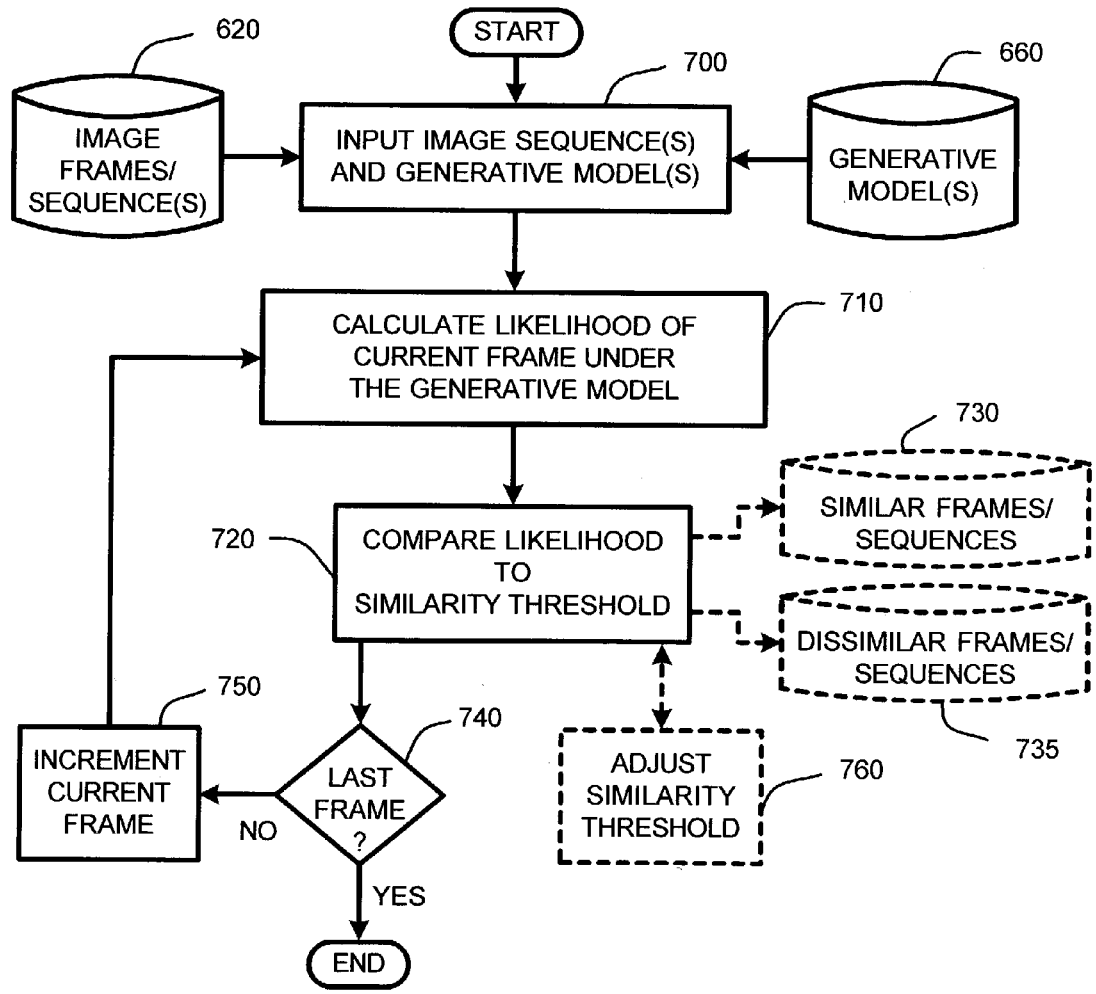
FIG. 7 illustrates an exemplary process for using learned generative models in searching one or more input image sequences to identify either similar or dissimilar image-frames.

It should be noted that the boxes and interconnections between boxes that are represented by broken or dashed lines in FIG. 6 and FIG. 7 represent alternate embodiments of the image sequence analyzer, and that any or all of these alternate embodiments, as described below, may be used in combination with other alternate embodiments as described throughout this document.

Referring now to FIG. 6 in combination with FIG. 2, the process can be generally described as system for learning color blob-based generative models for use in an automatic fully adaptive content-based analysis of image sequences. In general, as illustrated by FIG. 6, the image sequence analyzer begins by reading a sequence of one or more image frames 620. As discussed above, these image frames are obtained in alternate embodiments from a file, database, or imaging device.

Once the image sequence 620 has been input, user input 600 is collected in order to begin the process of learning a generative model from a query sample chosen from the image sequence 620. In particular, the user input includes selecting a representative sequence (i.e., the query sample) of image frames 605 to be used for learning the generative model. In addition, in one embodiment, the user input also includes selecting, specifying or otherwise identifying a number of blobs 610 to be used in modeling the query sample. However, as noted above, in another embodiment, the number of color blobs is automatically estimated 617 from the data using conventional probabilistic techniques such as, for example, evidence-based Bayesian model selection and minimum description length (MDL) criterion for estimating a number of blobs from the selected image sequence. Such probabilistic estimation techniques are well known to those skilled in the art, and will not be described in further detail herein.

Finally, in another embodiment, the user input also includes selecting, specifying or otherwise identifying a maximum number of iterations 615 to perform during the variational EM procedure used to learn the generative model. Selection or identification of a maximum number of iterations 615 is useful in the rare event that convergence is not achieved in a reasonable number of variational EM iterations when attempting to learn the generative model from the query sample.

Given the aforementioned user input 600, and in some embodiments, the automatically estimated number of blobs 617, the next step is to initialize a counter i to 1 625, with i representing the current frame in the query sample. The $i^{th}$ frame of the query sample is then input 630 from the image sequence 620. Next, as a part of the variational EM process, a determination 635 is made for each pixel in the current image frame as to whether each pixel represents either a background pixel, or alternately a blob pixel. Next, a check is made to see if the current image frame is the last frame 640 of the query sample. If the current image frame is not the last frame of the query sample, the counter i is incremented 650, and the next frame of the query sample is input from the image sequence 620. The process of inputting the next image frame from the query sample 630 and then using the variational EM process to determine 635 whether each pixel in the current image frame represents either a background pixel, or a blob pixel.

Once the last frame has been examined 635, a determination is made as to whether either a maximum number of iterations has occurred or whether model convergence 645 has been achieved as described above. If model convergence 645 has been achieved, then the generative model parameters are simply output 655, and if desired, stored for later use 660. However, if convergence has not been achieved, and a maximum desired number of iterations has not been reached, then the generative model parameters are updated 665 with the current parameter values being used to define the generative model, and a second pass through the image frames in the query sample is made in exactly the same manner as described above. However, with the second and subsequent passes through the query sample, the generative model gets closer to convergence as the model parameters are updated 665 with each pass. Note that in another embodiment, the image sequence analyzer uses conventional on-line probabilistic learning techniques for updating model parameters 670 after each image frame is processed rather then waiting until the entire representative image sequence has been processed as described above.

These iterative passes through the query sample then continue until either convergence is reached 645, or until the maximum desired number of iterations has been reached. Again, as noted above, at this point, the current generative model parameters are simply output 655, and if desired, stored for later use 660.

Next, as illustrated by FIG. 7, once the generative model has been learned, either as described above, or by any other means, the generative model 660 is then input 700 along the image sequence 620 to be analyzed by the image sequence analyzer. Each frame in the entire image sequence 620, starting with the first frame of the image sequence, is then compared to the generative model to determine a likelihood 710 for each frame under the generative model. This likelihood is then compared 720 to a similarity threshold for purposes of determining the approximate similarity of the query sample to the current image frame. As described above, in alternate embodiments, either similar image frames 730, or dissimilar image frames 735 are then stored to files or databases for later browsing or review by the user. Note that in one embodiment, the aforementioned similarity threshold is adjustable 760 to allow for greater flexibility in identifying similar and dissimilar image frames.

Next, a determination is made as to whether the last frame of the image sequence 620 has been compared to the generative model. If the current frame is the last frame 740, then the process is ended. However, if the current image frame is not the last image frame of the image sequence 620, then the frame count is simply incremented by one, and the likelihood of the next image frame under the generative model is calculated 710. Again, the likelihood of this next image frame is compared to a similarity threshold to determine whether or nor that image frame is similar to the image frames representing the query sample.

This process then continues, with the current frame continuously being incremented 750, until the last image frame of the image sequence 620 has been reached.

5.0 Tested Embodiments:

The following sections describe several uses of the image sequence analyzer. In particular, the following sections describe using the image sequence analyzer for likelihood based variable speed fast forwarding through an image sequence, searching through an image sequence using likelihood under the generative model, and finally, identifying unusual events in an image sequence, again using likelihood under the generative model.

5.1 Intelligent Fast Forward:

In a tested embodiment of the image sequence analyzer, the learned generative models described above were used to create an image frame similarity-based intelligent fast forward application. In general, the approach to intelligent image or video fast forwarding is based on using the likelihood of the current frame under the generative model to control the playback speed. In portions of the image sequence having a lower likelihood under the generative model, the playback speed of the image sequence is increased. Conversely, as the likelihood of the current frame under the generative model increases, the playback speed is decreased, thereby providing increased viewing time for portions of the image sequence which are more similar to the query sample. This has the advantage of using a familiar interface to searching through video, e.g., the fast forward button, while the danger of fast forwarding over interesting content is reduced. In such a system, the user can still have the control over the fast forward speed, thus reducing the dependence on the automatic media analysis.

Clearly there are many ways of implementing the playback speed/frame similarity relationship. For example, in one embodiment, the fast forward speed is denoted by V, with a functional relationship between this speed and the likelihood under the generative model being determined by Equation 13:

$$V_t = r(\log p(f_t)), \text{ or}$$

$$V_t = r(\log p(\{f_u\}_{u=t, \ldots, t+\Delta t})) \quad \text{Equation 13}$$

where r is a monotone non-increasing function. Note that the second form of Equation 13 is useful when the likelihood model is defined on a single frame and not on an image sequence as described in the previous section. Further, the second form of Equation 13 is also generally preferable because of it provides the power to anticipate a change and gently change the speed around the boundaries of the interesting frames. This is especially useful if the user is trying to extract a clip or image sequence from a larger video or image sequence in order to compile a collection of image frames as a summary, for instance. Such a need is typical in personal media usage.

Figure 8A:
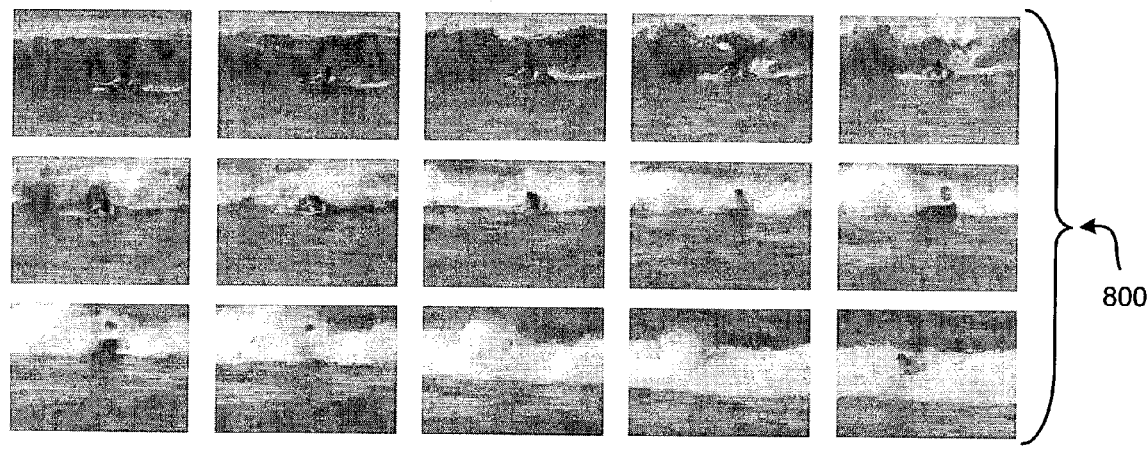
FIG. 8A illustrates a number of image frames from an image sequence that were used as a query sample for training generative models in a working embodiment of the image sequence analyzer.
Figure 8B:
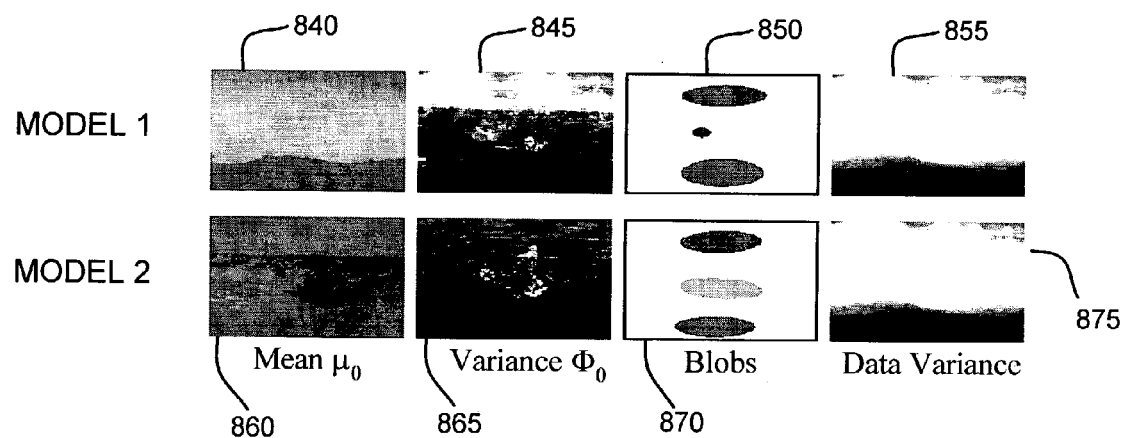
FIG. 8B illustrates two alternate generative models that were learned from the same image sequence represented from FIG. 8A by using different initial conditions for learning each alternate model.

5.2 Searching with the Generative Model:

The generative model can balance causes of variability in various ways to design a good likelihood-based measure of similarity. For example in a tested embodiment of the image sequence analyzer, two alternate generative models of "boogie-boarding" were learned given different initial conditions as illustrated in FIG. 8A and FIG. 8B. However, both generative models were observed to capture the variability in the data in a reasonable way and have created similar generalizations. They are also equally effective in searching for similar image sequences. In particular, FIG. 8A illustrates a number in image frames 800 from an image sequence that were used as a query sample for training two generative models using different initial conditions. As illustrated by FIG. 8B, the first model (see 840 through 855) uses a detailed pixel-wise model s=0 to capture the wave's foam and two blue blobs (see 850) to adjust the appearance of the ocean in the absence of the foam. The third blob (see 850) is modeling a boogie-boarder. In contrast, the second model has placed the boogie boarder against a foam-free ocean into a detailed appearance model s=0, and uses the three blobs (see 870) to model the foam as well as the darker and lighter blue regions of the ocean.

Figure 9:
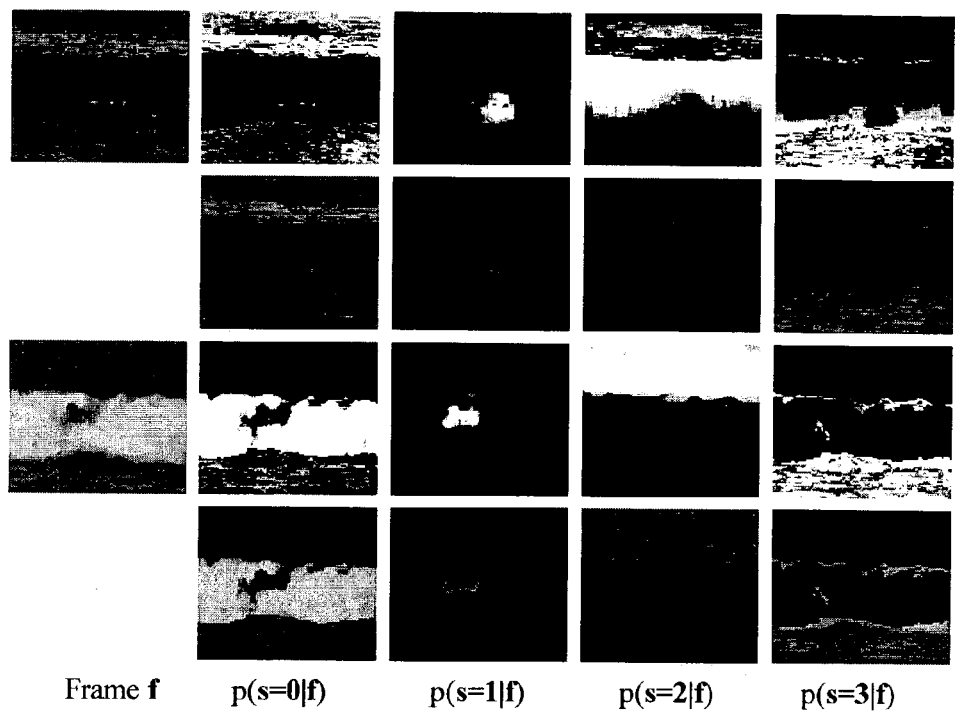
FIG. 9 illustrates the results of inference using a first model illustrated by FIG. 8B.
Figure 10:
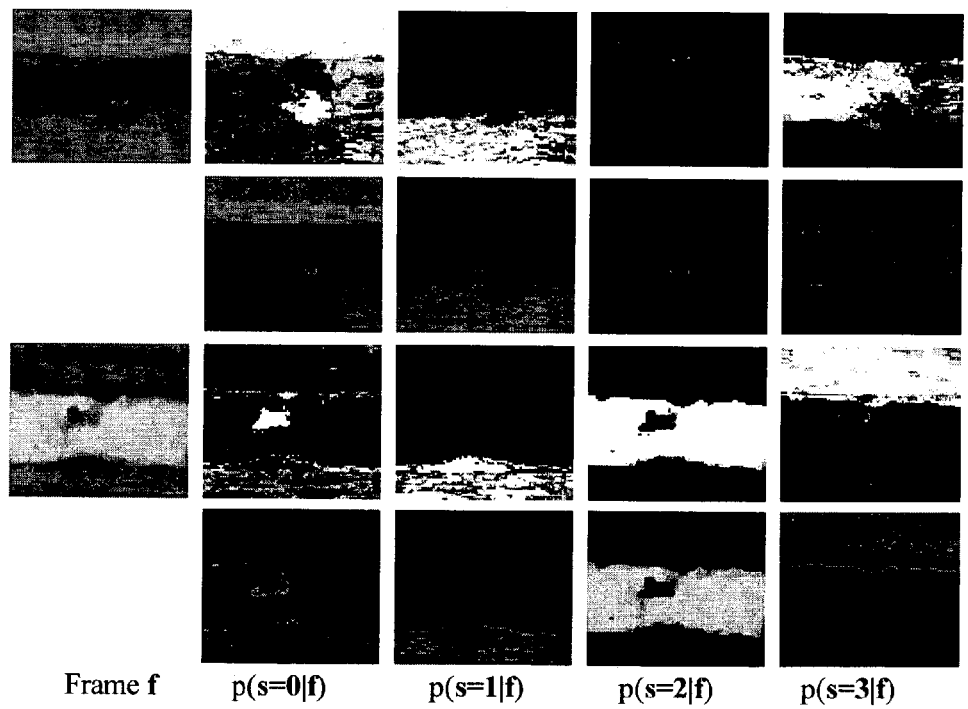
FIG. 10 illustrates the results of inference using a second model illustrated by FIG. 8B.

FIG. 9 and FIG. 10 illustrate how these two models understand two very different frames from the sequence. However, while the two models place objects into significantly different components s, they are both provide a reasonably good fit to the data and a high likelihood for both frames. For example, FIG. 9 illustrates inference using model 1 from FIG. 8B on two very different frames shown in the first column. The rest of the columns show segmentation, i.e., posterior probability maps q(s(i,j)). The color images in each of the other rows show the segmentation q(s) multiplied with the frame to better show which regions were segmented. Similarly, FIG. 10 illustrates inference using model 2 from FIG. 8B on the same two image frames provided in the first column of FIG. 9. Again, the remaining columns show segmentation, i.e., the posterior probability maps q(s(i,j)). The color images in every other row show the segmentation q(s) multiplied with the frame to better show which regions were segmented.

Note that these figures, 8A through 10, illustrate the indifference to a particular explanation of the data in contrast to a conventional bottom-up approach which compares two video segments by comparing two extracted structures, thus potentially failing if the system happens to extract the components in a consistent fashion.

5.3 Detecting Unusual Events in an Image Sequence:

In one embodiment, if an event of interest is buried in a long segment of uninteresting material, the search strategy detailed above can be reversed and a single or mixed scene model can be trained on the query sample and the search criteria can then be defined in terms of finding video segments that are unlikely under the model.

Figure 11A:
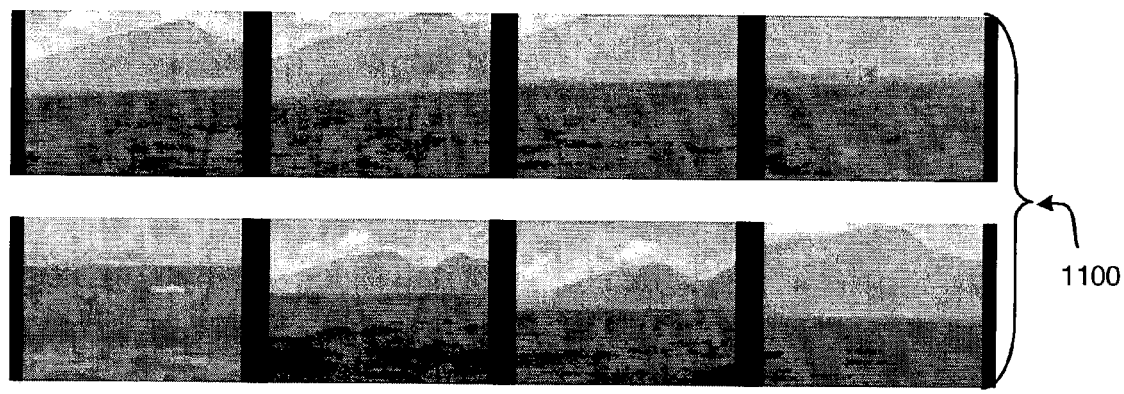
FIG. 11A illustrates a short sequence of image frames from a video sequence of a boat ride as examined in a tested embodiment of the image sequence analyzer
Figure 11B:
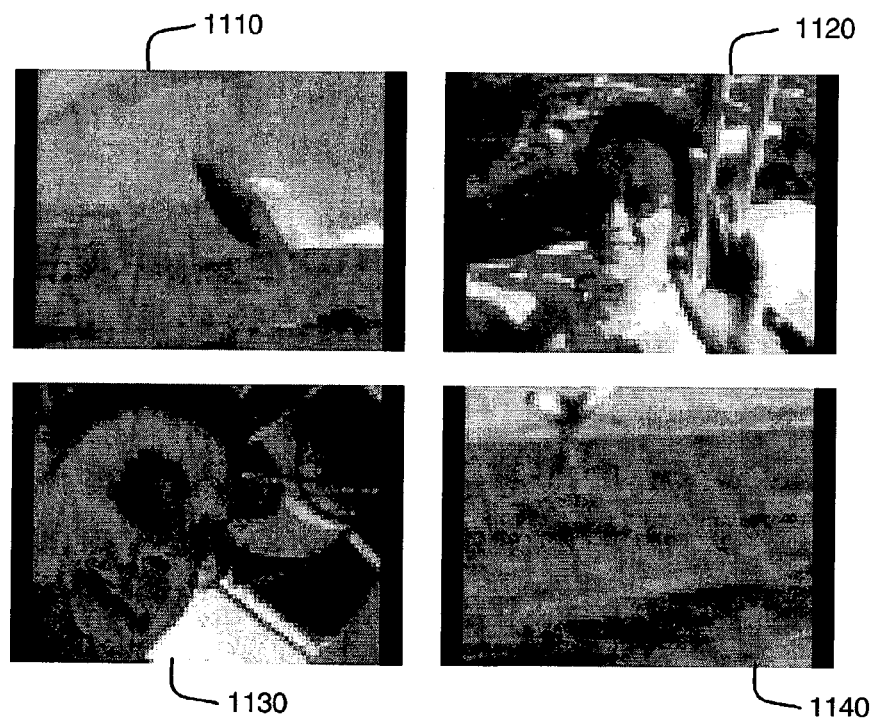
FIG. 11B illustrates the results of a search for image frames and sequences that were not likely under a generative model learned from the image sequence of FIG. 11A.

For example, in a typical video sequence continuously filmed during a long boat ride, some interesting frames of whale breaching are buried in the overall video sequence which consists mostly of frames showing an empty ocean and distant mountains. Given this image sequence, a generative model was trained on a typical scene, as illustrated by the frames 1100 of FIG. 11A. The resulting generative model was then used to find unusual segments that had a low likelihood under the model generated from the query sample. An example of the results of the search for image frames and sequences that were not likely under the learned generative model are provided in FIG. 11B. In particular, FIG. 11B illustrates four image frames, 1110, 1120, 1130, and 1140 which represent the content in the overall image that was not merely the empty ocean with the distant mountain background. Clearly, such an application is useful for quickly scanning interesting portions of an image sequence without the need to first train generative models for many different types of frames or frame sequences that may exist in the image sequence.

The foregoing description of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A system for automatically identifying image frames in an image sequence, comprising:

providing a first image sequence of at least one image frame;
automatically training a generative model on the first image sequence;
providing a second image sequence of at least one image frame; and
automatically determining a likelihood of at least one frame of the second image sequence under the generative model.

2. The system of claim 1 further comprising comparing the likelihood of the at least one frame of the second image sequence to a similarity threshold.

3. The system of claim 2 wherein image frames having a likelihood greater than the similarity threshold are determined to be similar to the first image sequence.

4. The system of claim 2 wherein image frames having a likelihood that is not greater than the similarity threshold are determined to be dissimilar to the first image sequence.

5. The system of claim 2 wherein the similarity threshold is adjustable.

6. The system of claim 2 further comprising an automatic likelihood-based variable speed playback of the second image sequence.

7. The system of claim 6 wherein the playback speed of the second image sequence decreases as the likelihood increases, and wherein the payback speed increases as the likelihood decreases.

8. The system of claim 1 wherein the generative model is based on color blobs for modeling objects in the first image sequence.

9. The system of claim 8 further comprising a predetermined number of color blobs to be used in learning the generative model.

10. The system of claim 8 wherein the number of color blobs to be used in learning the generative model is user adjustable.

11. The system of claim 8 wherein the number of color blobs to be used in learning the generative model is automatically probabilistically estimated.

12. The system of claim 8 wherein the generative model includes a set of model parameters that probabilistically represent the entire first image sequence.

13. The system of claim 12 wherein the model parameters include:
  spatial covariance matrices of the blobs, with eigen values of the matrices controlling a size of each blob;
  blob color distribution parameters; and
  a scene background model.

14. The system of claim 1 wherein the generative model is capable of modeling multiple objects in the first image sequence.

15. The system of claim 14 wherein the generative model is capable of modeling occluding objects in the first image sequence.

16. The system of claim 1 wherein automatically training the generative model on the first image sequence comprises performing an inferential probabilistic analysis of each image frame in the first image sequence for learning a probabilistic explanation of the first image sequence.

17. The system of claim 16 wherein performing an inferential probabilistic analysis of each image frame comprises performing an iterative variational expectation-maximization analysis of each image frame of the first image sequence.

18. The system of claim 17 wherein the iterative variational expectation-maximization analysis of each image frame of the first image sequence is sequentially iterated until convergence of variational parameters of the generative model is achieved.

19. The system of claim 17 wherein the iterative variational expectation-maximization analysis of each image frame of the first image sequence is sequentially iterated until a predetermined number of iterations have been completed.

20. The system of claim 17 wherein the iterative variational expectation-maximization analysis of each image frame of the first image sequence is sequentially iterated until a user adjustable number of iterations have been completed.

21. The system of claim 16 wherein an expectation step of the expectation-maximization analysis maximizes a lower bound on a log-likelihood of each image frame of the first image sequence by inferring approximations of variational parameters.

22. The system of claim 21 wherein a maximization step of the generalized expectation-maximization analysis automatically adjusts generative model parameters in order to maximize a lower bound on a log-likelihood of each image frame of the first image sequence.

23. The system of claim 22 wherein the expectation step and the maximization step are sequentially iterated until convergence of the variational parameters and generative model parameters is achieved.

24. The system of claim 1 wherein parameters of the generative model are updated incrementally without iterating as each frame of the first image sequence is processed.

25. The system of claim 16 wherein performing an inferential probabilistic analysis of each image frame comprises:
   performing an iterative variational expectation-maximization analysis of each image frame of the first image sequence; and
   updating the generative model after each variational expectation-maximization analysis of each image frame of the first image sequence.

26. A computer-implemented process for automatically identifying similar image frames in one or more image sequences, comprising:
   acquire at least one image sequence, each image sequence having at least one image frame;
   select a query sample consisting of at least one image frame from one of the at least one image sequences;
   input a desired number of blobs to be modeled in generative model of the query sample;
   automatically learn a generative model from the query sample, wherein the generative model includes a set of model parameters that represent the desired number of blobs; and
   compare the frames in each image sequence to the generative model to determine a likelihood of each frame under the generative model.

27. The computer-implemented process of claim 26, wherein the generative model accounts for camera shake by modeling image pixel displacements in the generative model.

28. The computer-implemented process of claim 26 wherein the likelihood of each frame under the generative model is compared to an adjustable similarity threshold.

29. The computer-implemented process of claim 28 wherein image frames that have a likelihood greater than the similarity threshold are similar to the at least one image frame of the query sample, and wherein all other image frames are dissimilar to the at least one image frame of the query sample.

30. The computer-implemented process of claim 26 further comprising an automatic likelihood-based variable speed playback of at least one of the image sequences, and wherein a playback speed the at least one image sequence is inversely proportional to the likelihood of each image frame.

31. The computer-implemented process of claim 30 wherein the playback speed decreases as the likelihood increases, and wherein the payback speed increases as the likelihood decreases.

32. The computer-implemented process of claim 26 wherein the desired number of blobs is predetermined.

33. The computer-implemented process of claim 26 wherein the desired number of blobs is user adjustable.

34. The computer-implemented process of claim 26 wherein the model parameters include:
   spatial covariance matrices of the blobs;
   blob color distribution parameters;
   blob sizes controlled by eigen values of the spatial covariance matrices; and
   a scene background model.

35. The computer-implemented process of claim 26 wherein the generative model models multiple objects in the query sample as blobs, and wherein the generative model is capable of modeling occluding objects in the query sample.

36. The computer-implemented process of claim 26 wherein automatically learning the generative model from the query sample comprises performing an variational expectation-maximization (EM) analysis of each image frame in the query sample for learning a probabilistic explanation of the query sample.

37. The computer-implemented process of claim 36 wherein the variational EM analysis of each image frame of the query sample is sequentially iterated through the query sample until convergence of variational parameters of the generative model is achieved.

38. The computer-implemented process of claim 36 wherein the variational EM analysis of each image frame of the query sample is sequentially iterated through the query sample until a user adjustable number of iterations have been completed.

39. A computer-readable medium having computer executable instructions for automatically determining a playback speed for an image sequence, comprising:
   selecting a query sample consisting at least one image frame;
   automatically learning a generative model from the query sample;
   providing at least one image sequence for playback;
   comparing the frames in the at least one image sequence provided for playback to the generative model to determine a likelihood of each frame under the generative model; and
   automatically varying a playback speed of the at least one image sequence in inverse proportion to the likelihood of each frame.

40. The computer-readable medium of claim 39 wherein the playback speed the at least one image sequence decreases as the likelihood increases, and wherein the payback speed increases as the likelihood decreases.

41. The computer-readable medium of claim 40 wherein the playback speed the at least one image sequence is determined by a combined likelihood of one or more adjacent image frames in the at least one image sequence.

42. The computer-readable medium of claim 39, wherein camera shake is modeled by the generative model by modeling image pixel shifts.

43. The computer-readable medium of claim 39 wherein the generative model is based on a user definable number of color blobs for modeling multiple objects represented in the query sample.

44. The computer-readable medium of claim 43 wherein the generative model is capable of modeling occluding objects.

45. The computer-readable medium of claim 39 further comprising comparing the likelihood of each frame under the generative model to a similarity threshold.

46. The computer-readable medium of claim 45 wherein image frames that have a likelihood greater than the similarity threshold are identified as being similar to the at least one image frame of the query sample, and wherein image frames that do not have a likelihood greater than the similarity threshold are identified as being dissimilar to the at least one image frame of the query sample.

47. The computer-readable medium of claim 45 wherein the similarity threshold is user adjustable.

48. The computer-readable medium of claim 39 wherein automatically learning the generative model from the query sample comprises performing an variational expectation-maximization (EM) analysis of each image frame in the query sample for learning a probabilistic explanation of the query sample.

49. The computer-readable medium of claim 48 wherein the variational EM analysis of each image frame of the query sample is sequentially iterated through the query sample until a user adjustable number of iterations have been completed.

\* \* \* \* \*